(12) United States Patent
Hill et al.

(10) Patent No.: US 7,622,412 B2
(45) Date of Patent: Nov. 24, 2009

(54) METHOD FOR REGENERATING A HYDROGENATION CATALYST

(75) Inventors: Thomas Hill, Ludwigshafen (DE); Mathias Haake, Mannheim (DE); Harald Dialer, Mannheim (DE)

(73) Assignee: BASF SE, Ludwigshafen (DE)

( * ) Notice: Subject to any disclaimer, the term of this patent is extended or adjusted under 35 U.S.C. 154(b) by 690 days.

(21) Appl. No.: 10/532,233

(22) PCT Filed: Oct. 15, 2003

(86) PCT No.: PCT/EP03/11410

§ 371 (c)(1), (2), (4) Date: Apr. 22, 2005

(87) PCT Pub. No.: WO2004/037409

PCT Pub. Date: May 6, 2004

(65) Prior Publication Data

US 2006/0035779 A1   Feb. 16, 2006

(30) Foreign Application Priority Data

Oct. 23, 2002 (DE) .............................. 102 49 368

(51) Int. Cl.
- *B01J 38/04* (2006.01)
- *B01J 38/10* (2006.01)
- *B01J 23/96* (2006.01)
- *B01J 23/90* (2006.01)
- *B01J 23/50* (2006.01)
- *C07C 5/08* (2006.01)
- *B01J 23/44* (2006.01)

(52) U.S. Cl. ............................ 502/34; 502/53; 502/330; 502/339; 585/277

(58) Field of Classification Search ................. 502/34, 502/53, 330, 339; 585/277
See application file for complete search history.

(56) References Cited

U.S. PATENT DOCUMENTS

| | | | | |
|---|---|---|---|---|
| 5,063,194 A | * | 11/1991 | Broecker et al. | ............ 502/314 |
| 5,130,172 A | * | 7/1992 | Hicks et al. | ................. 427/584 |
| 5,332,705 A | * | 7/1994 | Huang et al. | .................. 502/53 |
| 5,817,589 A | | 10/1998 | De Agudelo et al. | |
| 6,676,919 B1 | * | 1/2004 | Fischer et al. | ............... 423/584 |
| 2003/0023121 A1 | | 1/2003 | Frenzel et al. | |

FOREIGN PATENT DOCUMENTS

| | | |
|---|---|---|
| DE | 199 59 064 A1 | 12/1999 |
| EP | 0 550 150 A1 | 7/1993 |
| GB | 907348 | 10/1962 |
| GB | 1158418 * | 7/1969 |
| WO | WO 94/00232 | 1/1994 |
| WO | WO 02/00341 A2 | 1/2002 |

* cited by examiner

*Primary Examiner*—Wayne Langel
*Assistant Examiner*—Brittany M Martinez
(74) *Attorney, Agent, or Firm*—Connolly Bove Lodge & Hutz LLP

(57) ABSTRACT

A process for regenerating a hydrogenation catalyst which has been used in a gas-phase hydrogenation, which comprises stripping at from 50 to 300° C. with a substance or a substance mixture which under the process conditions has no oxidizing action and is present in the gaseous state is described.

21 Claims, No Drawings

METHOD FOR REGENERATING A HYDROGENATION CATALYST

CROSS REFERENCE TO RELATED APPLICATION

The present application is a National Stage application of PCT/EP2003/011410, filed Oct. 15, 2003, which claims priority from German Patent Application No. DE 102 49368.5, filed Oct. 23, 2002.

The invention relates to a process for regenerating a hydrogenation catalyst.

Hydrogenation catalysts are used in many chemical reactions. They generally comprise elements of group VIII of the Periodic Table, e.g. iron, cobalt, nickel, ruthenium, rhodium, palladium, platinum and iridium, as active components. Promoters such as copper, silver, gold, zinc, tin, bismuth or antimony may additionally be present.

Hydrogenation catalysts are frequently used in supported form, with the active component being applied to a support. Support materials used are frequently metals, oxidic materials such as aluminum oxide or silicon dioxide, carbon fibers or polymers.

As a result of secondary reactions, oligomers and polymers, known as green oil, are formed from the reactants in the hydrogenation reactors, and these lead to carbon-containing deposits on the hydrogenation catalyst. As a result, pores become blocked, active centers become inaccessible, the activity of the catalyst decreases and regeneration of the catalyst becomes necessary. In the classical regeneration method, the carbon-containing deposits are burnt oxidatively, frequently by passing air over the catalyst at elevated temperatures of from about 400 to 500° C. To avoid local overheating, water vapor is frequently added. A disadvantage of this classical regeneration is that the activity of the regenerated catalyst is generally lower than that of the fresh catalyst.

It is known from WO 94/00232 that a catalyst which has previously been used for removing acetylenic impurities from an olefin stream can be regenerated virtually completely by stripping with a stream of hydrogen at a linear velocity of at least 15.2 cm/second at from 315 to 400° C., without oxidative treatment.

WO 02/00341 describes a regeneration process for hydrogenation catalysts which comprises passing a hydrogen-containing gas stream over the catalyst at from 200 to 1000° C., without combustion using an oxygen-containing gas.

GB-B 907,348 discloses a process for regenerating a nickel catalyst applied to an inert support which has been used in the selective hydrogenation of petroleum spirit, in which the catalyst is treated in-situ or ex-situ with a hydrogen-containing gas at 150° C. for from 1 to 24 hours.

It is an object of the present invention to provide a process for regenerating a hydrogenation catalyst which has been used in a gas-phase hydrogenation, by means of which the original activity of the fresh hydrogenation catalyst is largely restored.

We have found that this object is achieved by a process for regenerating a hydrogenation catalyst which has been used in a gas-phase hydrogenation, which comprises stripping at from 50 to 300° C. with a substance or a substance mixture which under the process conditions has no oxidizing action and is present in the gaseous state.

In the stripping process of the present invention, a substance or a substance mixture which is gaseous at the process temperature in the range from 50 to 300° C. is therefore passed over the used hydrogenation catalyst. In this process, the relatively volatile components of the green oil are carried out in gaseous form, while less volatile components of the green oil which had coated and thus deactivated the hydrogenation catalyst during operation are melted and flow away.

It is important for the purposes of the present invention that a stripping gas which has no oxidizing action under the process conditions is chosen.

It has surprisingly been found that the original activity of the fresh catalyst can be restored virtually completely by regeneration by means of the process of the present invention, even though the surface of the hydrogenation catalyst was largely coated with carbon after the purification process.

The process of the present invention can advantageously be used to regenerate a hydrogenation catalyst which has previously been used in the selective hydrogenation of a $C_2$ and/or $C_3$ fraction. This hydrogenation can be either a front-end hydrogenation or a tail-end hydrogenation. Such a process and a catalyst particularly suitable for this purpose are known from DE-A 19959064, whose disclosure is hereby fully incorporated by reference into the present patent application.

As stripping gas, it is in principle possible to use any substance or any substance mixture which does not have an oxidizing action on the hydrogenation catalyst. The substance or substance mixture is preferably selected from the group consisting of hydrogen, nitrogen, argon, hydrocarbons, preferably saturated hydrocarbons, particularly preferably methane.

Nitrogen is particularly advantageous, especially because of its availability, its price and its heat capacity; a mixture of nitrogen and hydrogen is similarly advantageous.

Stripping is advantageously carried out at from 70 to 250° C., in particular from 100 to 150° C.

The stripping time is preferably from 30 minutes to a number of days, particularly preferably from one hour to 2 days. At a higher temperature, a shorter process time is preferred.

In a further process variant, the hydrogenation catalyst is rinsed with a preferably nonpolar organic solvent or solvent mixture in addition to stripping. Any solvent or solvent mixture which at least partly dissolves the carbon-containing deposits on the hydrogenation catalyst is suitable for this purpose. Hydrocarbons, for example cyclohexane or a benzene/toluene/xylene fraction, are particularly useful.

Rinsing is preferably carried out at from 20 to 50° C., particulary preferably at ambient temperature. The upper limit for the process temperature depends on the boiling point of the solvent or solvent mixture used, i.e. it should be no higher than this boiling point. A process time of from 15 to a plurality of days is generally sufficient for rinsing.

The regeneration of the hydrogenation catalyst can be carried out in situ, in supernatant solvent and/or in solvent circulated by means of a pump. However, it is also possible to remove the hydrogenation catalyst from the reactor, i.e. rinse it ex-situ, preferably in supernatant solvent and/or in circulating solvent, preferably with additional introduction of gas and/or with the aid of ultrasound.

Particular preference is given to carrying out the hydrogenation by firstly rinsing the hydrogenation catalyst and subsequently stripping it.

If the hydrogenation catalyst is regenerated for more than the first time, it can be advantageous, after the catalyst has been treated two or more times by stripping or rinsing and stripping as described above, to regenerate it by oxidative treatment or by a combination of stripping or rinsing and stripping and oxidative treatments. This will be necessary when coating with carbon-containing deposits has progressed a long way.

The process is particularly useful for regenerating hydrogenation catalysts in the form of thin-film catalysts. Thin-film catalysts have a thickness of the active material in the range from about 0.01 µm to 100 µm. Thin-film hydrogenation catalysts are described, for example, in EP-A0412415, EP-A0564830 or EP-A0965384 and are obtained by impregnation (EP-A 0 412 415), vapor deposition under reduced pressure (EP-A 0 564 830) or sputtering (EP-A 0 965 384).

The thin-film hydrogenation catalyst is preferably made up of an active composition comprising one or more hydrogenation-active metals, in particular palladium, particularly preferably silver-doped palladium, which has been applied to a nonporous, preferably metallic support which is preferably in the form of a woven mesh or knitted mesh.

The invention is illustrated below by means of examples.

The catalysts tested were monolithic thin-film hydrogenation catalysts, hereinafter referred to as TFCs for short, which comprised palladium as active composition and silver as promoter on a knitted stainless steel mesh support and had been obtained as follows:

A 20 cm wide strip of knitted metal mesh made of the material No. 1.4301 and having a wire diameter of 0.12 mm was heated in a muffle furnace. After cooling to room temperature, the knitted mesh which had been pretreated in this way was rolled up.

It was subsequently treated with an impregnation solution comprising palladium nitrate, silver nitrate and distilled water.

The impregnated knitted metal mesh was dried and calcined in air.

The TFC produced in this way was used in a process for the selective hydrogenation of hydro-dehydro-linalool (HDHL) to hydro-linalool (H-LIN), which proceeds according to the following reaction equation:

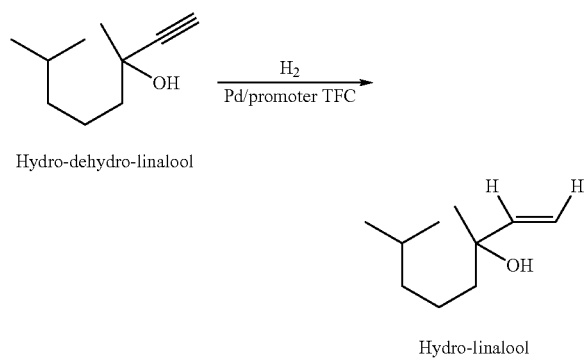

Hydro-dehydro-linalool

Hydro-linalool

The reaction was carried out continuously and isothermally in the upflow mode in a packed bubble column in a laboratory glass apparatus. The catalyst consisted of 2 monoliths made from the above-described knitted metal mesh, in each case having a height of 200 mm and a length of 300 mm and wound to a final diameter of 22 mm. The substrate volume was 0.5 kg of HDHL having a purity of 99%.

The following process parameters were set:

| Pressure: | 1.1 bar |
|---|---|
| Temperature: | 80° C. |
| Circulation of reaction liquid: | 200 m$^3$/m$^2$/h |
| Gas circulation (hydrogen): | 200 m$^3$/m$^2$/h |

EXAMPLES 1 TO 7 AND COMPARATIVE EXAMPLES C1 TO C3

Influence of Regeneration Temperature and Time on the Catalyst Activity

A TFC as described above was tested under the above-described process conditions. The TFC was converted by reduction with hydrogen into a hydrogenation active form and subsequently, to simulate deactivation, steeped in green oil. For comparison, the TFC was regenerated by the classical, oxidative treatment with steam/air or, according to the present invention, by means of nitrogen. Regeneration temperature and time were varied and the catalyst activity after regeneration was measured by means of the relative conversion in the above-described selective hydrogenation of HDHL, with the conversion over fresh catalyst being assigned a value of 100%.

The experimental results are summarized in Table 1 below:

|  | Treatment | Temperature [° C.] | Time | Rel. conversion % |
|---|---|---|---|---|
| C1 | Steam/air | 400 | 4 h | 79 |
| C2 | Steam/air | 400 | 24 h | 63 |
| 1 | N$_2$ | 100 | 4 h | 98 |
| 2 | N$_2$ | 150 | 4 h | 89 |
| 3 | N$_2$ | 200 | 4 h | 81 |
| C3 | N$_2$ | 400 | 4 h | 52 |
| 4 | N$_2$ | 100 | 4 h | 98 |
| 5 | N$_2$ | 100 | 24 h | 84 |
| 6 | N$_2$ | 150 | 24 h | 83 |

The results show that increasing the temperature and time of the regeneration has adverse effects on the catalyst activity after the regeneration.

COMPARATIVE EXAMPLES C4 AND C5 AND EXAMPLES 7 AND 8

Influence of the Regeneration Method on the Activity of a TFC Which has Been Used in a Production Reactor for the Selective Hydrogenation of a C$_3$ Fraction The TFC obtained by the above-described method and shaped to form packets as described in DE-A 100 05 663 was used in a production reactor for the selective hydrogenation of propyne and/or propadiene in C$_3$ fractions to propylene, referred to as "Process B" in DE-A 19959064. After a running time of one year, the catalyst was removed from the reactor and characterized as such, i.e. without regeneration (comparative example C4), after classical, oxidative regeneration using a steam/air mixture at 400° C. (comparative example C5), after regeneration according to the present invention by stripping with a stream of nitrogen at 100° C. for 24 hours (example 8) and after regeneration according to the present invention by means of brief stripping with nitrogen in the reactor and subsequent rinsing with a benzene/toluene/xylene solvent mixture under the following process conditions:

Solvent mixture volume/catalyst volume: 1.5:1

Time: 6 hours

Temperature: 25° C.

(example 9 according to the present invention).

In all comparative examples (C4, C5) and examples (7, 8), the following properties of the TFC were determined:

Diameter of the primary particles in nanometers by means of transmission electron microscopy, Carbon content at the surface of the TFC in atom percent (atom-%), measured by means of X-ray photoelectron spectroscopy and Relative conversion C(rel.) for the selective hydrogenation of HDHL to H-LIN, based on 100% conversion for the fresh TFC.

The results are summarized in table 2 below:

|    | Regeneration method | Diameter [nm] | C content [atom-%] | C (rel.) [%] |
|----|---------------------|---------------|--------------------|--------------|
| C4 | —                   | 10-20         | 94                 | 85           |
| 7  | $N_2$ stripping     | 10-20         | 85                 | 94           |
| C5 | Classical           | 100           | 19                 | 65           |
| 8  | Stripping, rinsing  | 10-20         | 78                 | 94           |

The experimental results show that the diameter of the primary particles is not changed by the regeneration methods of the present invention. Although the carbon content at the catalyst surface decreases, albeit only insignificantly, compared to the classical oxidative regeneration method, this is surprisingly not a decisive factor in determining the catalyst activity, i.e. the achievable conversions. In contrast, the regeneration method of the present invention achieves conversions which are only slightly below the conversions obtained using the fresh catalyst.

We claim:

1. A process for regenerating a hydrogenation catalyst comprising stripping at from 50 to 200° C. with a substance or a substance mixture which under the process conditions has no oxidizing action and is present in the gaseous state and wherein the hydrogenation catalyst is formed by an active composition, which has been applied to a nonporous, metallic support and which has been used in a gas-phase selective hydrogenation of acetylene in a $C_2$ fraction or of propyne and/or propadiene in a $C_3$ fraction.

2. The process as claimed in claim 1, wherein the metallic support is in the form of a woven mesh or knitted mesh of a nonporous metal.

3. The process as claimed in claim 1, wherein the substance or substance mixture which is used for stripping is selected from the group consisting of hydrogen, nitrogen, argon and hydrocarbons.

4. The process as claimed in claim 3, wherein nitrogen or a mixture of nitrogen and hydrogen is used for stripping.

5. The process as claimed in claim 1, wherein stripping is carried out at from 70 to 200° C.

6. The process as claimed in claim 1, wherein the hydrogenation catalyst is rinsed with a nonpolar organic solvent or solvent mixture in addition to stripping.

7. The process as claimed in claim 6, wherein rinsing is carried out at ambient temperature.

8. The process as claimed in claim 6, wherein rinsing is carried out for a period of from 15 minutes to a plurality of days.

9. The process as claimed in claim 6 carried out in situ.

10. The process as claimed in claim 6 carried out ex situ.

11. The process as claimed in claim 6, wherein the hydrogenation catalyst is firstly rinsed and subsequently stripped.

12. A process for the repeated regeneration of a hydrogenation catalyst, which comprises regenerating the hydrogenation catalyst two or more times by stripping as claimed in claim 1 and subsequently by oxidative treatment or by rinsing and stripping as claimed in claim 6 and subsequently by oxidative treatment.

13. The process as claimed in claim 1, wherein the hydrogenation catalyst is a thin-film catalyst.

14. The process as claimed in claim 13, wherein the hydrogenation catalyst is formed by an active composition comprising one or more hydrogenation-active metals.

15. The process as claimed in claim 3, wherein the substance or substance mixture which is used for stripping comprises saturated hydrocarbons.

16. The process as claimed in claim 15, wherein the saturated hydrocarbon is methane.

17. The process as claimed in claim 5, wherein stripping is carried out at from 100 to 150° C.

18. The process as claimed in claim 9, wherein the process is carried out in supernatant solvent and/or in solvent circulated by means of a pump.

19. The process as claimed in claim 14, wherein the hydrogenation-active metal is palladium.

20. The process as claimed in claim 19, wherein palladium is silver doped.

21. The process as claimed in claim 1, wherein stripping is carried out at from 50 to 100° C.

* * * * *